US010026140B2

(12) United States Patent
Diamond

(10) Patent No.: US 10,026,140 B2
(45) Date of Patent: Jul. 17, 2018

(54) USING A SCALABLE GRAPHICS SYSTEM TO ENABLE A GENERAL-PURPOSE MULTI-USER COMPUTER SYSTEM

(75) Inventor: Michael Diamond, Los Gatos, CA (US)

(73) Assignee: Nvidia Corporation, Santa Clara, CA (US)

( * ) Notice: Subject to any disclaimer, the term of this patent is extended or adjusted under 35 U.S.C. 154(b) by 616 days.

(21) Appl. No.: 12/395,685

(22) Filed: Mar. 1, 2009

(65) Prior Publication Data

US 2009/0164908 A1  Jun. 25, 2009

Related U.S. Application Data

(63) Continuation-in-part of application No. 11/150,620, filed on Jun. 10, 2005, now Pat. No. 8,893,016.

(51) Int. Cl.
*G06F 3/00* (2006.01)
*G06T 1/20* (2006.01)

(52) U.S. Cl.
CPC ..................................... *G06T 1/20* (2013.01)

(58) Field of Classification Search
CPC .......... G06F 9/5044; G06F 9/505; G06F 9/50;
G06F 11/3433; G06F 2209/509; G06F
9/5011; G06F 9/5027; G06F 9/5083
USPC .......................................... 715/751; 345/501
See application file for complete search history.

(56) References Cited

U.S. PATENT DOCUMENTS

| | | | |
|---|---|---|---|
| 4,761,736 A | 8/1988 | Di Orio | |
| 4,949,280 A | 8/1990 | Littlefield | |
| 5,117,468 A | 5/1992 | Hino et al. | |
| 5,247,634 A | 9/1993 | Cline et al. | |
| 5,251,295 A | 10/1993 | Ikenoue et al. | |
| 5,276,798 A | 1/1994 | Peaslee et al. | |
| 5,289,574 A | 2/1994 | Sawyer | |
| 5,315,699 A | 5/1994 | Imai et al. | |
| 5,361,078 A | 11/1994 | Caine | |
| 5,377,320 A | 12/1994 | Abi-Ezzi et al. | |
| 5,388,206 A | 2/1995 | Poulton et al. | |
| 5,392,393 A | 2/1995 | Deering et al. | |
| 5,408,606 A | 4/1995 | Eckart | |
| 5,434,967 A | 7/1995 | Tannenbaum et al. | |
| 5,440,682 A | 8/1995 | Deering | |
| 5,448,655 A | 9/1995 | Yamaguchi | |
| 5,467,102 A | 11/1995 | Kuno et al. | |

(Continued)

FOREIGN PATENT DOCUMENTS

| KR | 1020050047243 | 5/2005 |
|---|---|---|
| TW | 421752 | 2/2001 |

(Continued)

OTHER PUBLICATIONS

Luke, E. J. et al., "Semotus Visum: a flexible remote visualization framework", IEEE Visualization 2002, Oct. 27-Nov. 1, 2002, Boston, MA, pp. 61-68.

(Continued)

*Primary Examiner* — Di Xiao

(57) ABSTRACT

A graphics system is disclosed. The graphics system includes at least one GPU (graphics processing unit) for processing a compute workload. The graphics system uses a multi-user manager for allocating the compute workload capability for each one of a plurality of users. Each user will use an access terminal.

21 Claims, 6 Drawing Sheets

(56) References Cited

U.S. PATENT DOCUMENTS

| | | | |
|---|---|---|---|
| 5,485,559 A | 1/1996 | Sakaibara et al. | |
| 5,493,643 A | 2/1996 | Soderberg et al. | |
| 5,523,769 A | 6/1996 | Lauer et al. | |
| 5,602,983 A | 2/1997 | Naba et al. | |
| 5,604,490 A * | 2/1997 | Blakley, III | G06F 21/41 340/5.74 |
| 5,606,336 A | 2/1997 | Yuki | |
| 5,668,995 A | 9/1997 | Bhat | |
| 5,694,150 A | 12/1997 | Sigona et al. | |
| 5,727,178 A | 3/1998 | Pletcher et al. | |
| 5,794,016 A | 4/1998 | Kelleher | |
| 5,781,747 A | 7/1998 | Smith et al. | |
| 5,784,035 A | 7/1998 | Hagiwara et al. | |
| 5,784,616 A | 7/1998 | Horvitz | |
| 5,784,628 A | 7/1998 | Reneris | |
| 5,790,862 A | 8/1998 | Tanaka et al. | |
| 5,889,989 A | 3/1999 | Robertazzi et al. | |
| 5,930,777 A | 7/1999 | Barber | |
| 5,956,046 A | 9/1999 | Kehlet et al. | |
| 6,002,409 A | 12/1999 | Harkin | |
| 6,028,586 A | 2/2000 | Swan et al. | |
| 6,044,215 A | 3/2000 | Charles et al. | |
| 6,064,403 A | 5/2000 | Hayashi et al. | |
| 6,067,097 A | 5/2000 | Morita et al. | |
| 6,085,216 A | 7/2000 | Huberman et al. | |
| 6,104,392 A | 8/2000 | Shaw et al. | |
| 6,141,021 A | 10/2000 | Bickford et al. | |
| 6,157,917 A | 12/2000 | Barber | |
| 6,191,800 B1 | 2/2001 | Arenburg et al. | |
| 6,206,087 B1 | 3/2001 | Nakase et al. | |
| 6,209,066 B1 | 3/2001 | Holzle et al. | |
| 6,249,294 B1 | 6/2001 | Lefebvre et al. | |
| 6,269,275 B1 | 7/2001 | Slade | |
| 6,282,596 B1 | 8/2001 | Bealkowski et al. | |
| 6,292,200 B1 | 9/2001 | Bowen et al. | |
| 6,301,616 B1 | 10/2001 | Pal et al. | |
| 6,304,952 B1 | 10/2001 | Suzuoki | |
| 6,329,996 B1 | 12/2001 | Bowen et al. | |
| 6,331,856 B1 | 12/2001 | Van Hook et al. | |
| 6,336,127 B1 | 1/2002 | Kurtzberg et al. | |
| 6,359,624 B1 | 3/2002 | Kunimatsu | |
| 6,397,343 B1 | 5/2002 | Williams et al. | |
| 6,473,086 B1 | 10/2002 | Morein et al. | |
| 6,476,816 B1 | 11/2002 | Deming et al. | |
| 6,496,187 B1 | 12/2002 | Deering et al. | |
| 6,501,999 B1 | 12/2002 | Cai | |
| 6,535,216 B1 | 3/2003 | Deming et al. | |
| 6,535,939 B1 | 3/2003 | Arimilli et al. | |
| 6,591,262 B1 | 7/2003 | MacLellan et al. | |
| 6,611,241 B1 | 8/2003 | Firester et al. | |
| 6,630,936 B1 | 10/2003 | Langendorf | |
| 6,631,474 B1 | 10/2003 | Cai et al. | |
| 6,654,826 B1 | 11/2003 | Cho et al. | |
| 6,670,958 B1 | 12/2003 | Aleksic et al. | |
| 6,683,614 B2 | 1/2004 | Walls et al. | |
| 6,700,586 B1 | 3/2004 | Demers | |
| 6,704,021 B1 | 3/2004 | Rogers et al. | |
| 6,708,217 B1 | 3/2004 | Colson et al. | |
| 6,711,691 B1 | 3/2004 | Howard et al. | |
| 6,714,200 B1 | 3/2004 | Talnykin et al. | |
| 6,760,031 B1 | 7/2004 | Langendoff et al. | |
| 6,760,684 B1 * | 7/2004 | Yang | G06F 11/3409 702/108 |
| 6,772,265 B2 | 8/2004 | Baweja et al. | |
| 6,798,420 B1 | 9/2004 | Xie | |
| 6,832,269 B2 | 12/2004 | Huang et al. | |
| 6,835,070 B1 | 12/2004 | Law | |
| 6,859,926 B1 | 2/2005 | Brenner et al. | |
| 6,864,891 B2 | 3/2005 | Myers | |
| 6,914,779 B2 | 7/2005 | Askeland et al. | |
| 6,919,894 B2 | 7/2005 | Emmot et al. | |
| 6,919,896 B2 | 7/2005 | Sasaki et al. | |
| 6,937,245 B1 | 8/2005 | Van Hook et al. | |
| 6,956,579 B1 | 10/2005 | Diard et al. | |
| 6,985,152 B2 | 1/2006 | Rubinstein et al. | |
| 7,019,752 B1 | 3/2006 | Paquette et al. | |
| 7,024,510 B2 | 4/2006 | Olarig | |
| 7,030,837 B1 | 4/2006 | Vong et al. | |
| 7,058,829 B2 | 6/2006 | Hamilton | |
| 7,079,149 B2 | 7/2006 | Main et al. | |
| 7,080,181 B2 | 7/2006 | Wolford | |
| 7,119,808 B2 * | 10/2006 | Gonzalez et al. | 345/502 |
| 7,176,847 B2 | 2/2007 | Loh | |
| 7,178,147 B2 * | 2/2007 | Benhase | G06F 9/505 718/100 |
| 7,203,909 B1 | 4/2007 | Horvitz et al. | |
| 7,260,839 B2 | 8/2007 | Karasaki | |
| 7,321,367 B2 | 1/2008 | Isakovic et al. | |
| 7,372,465 B1 * | 5/2008 | Tamasi | G06T 1/20 345/502 |
| 7,634,668 B2 | 12/2009 | White et al. | |
| 7,663,633 B1 * | 2/2010 | Diamond et al. | 345/503 |
| 2002/0047851 A1 | 4/2002 | Hirase et al. | |
| 2002/0073247 A1 | 6/2002 | Baweja et al. | |
| 2002/0099521 A1 * | 7/2002 | Yang | G06F 11/3409 702/186 |
| 2002/0107809 A1 | 8/2002 | Biddle et al. | |
| 2002/0118201 A1 | 8/2002 | Mukherjee et al. | |
| 2002/0130889 A1 | 9/2002 | Blythe et al. | |
| 2002/0141152 A1 | 10/2002 | Pokharna et al. | |
| 2002/0180725 A1 | 12/2002 | Simmonds et al. | |
| 2003/0051021 A1 * | 3/2003 | Hirschfeld | G06F 9/5077 709/223 |
| 2003/0067470 A1 | 4/2003 | Main et al. | |
| 2003/0071816 A1 * | 4/2003 | Langendorf | G06F 3/14 345/519 |
| 2003/0115344 A1 * | 6/2003 | Tang | H04L 63/0272 709/229 |
| 2003/0128216 A1 | 7/2003 | Walls et al. | |
| 2003/0137483 A1 | 7/2003 | Callway | |
| 2003/0193503 A1 | 10/2003 | Seminatore et al. | |
| 2003/0233391 A1 * | 12/2003 | Crawford, Jr. | G06F 9/505 718/104 |
| 2004/0008200 A1 | 1/2004 | Naegle et al. | |
| 2004/0021678 A1 * | 2/2004 | Ullah et al. | 345/700 |
| 2004/0032861 A1 | 2/2004 | Lee | |
| 2004/0039954 A1 | 2/2004 | White et al. | |
| 2004/0103191 A1 | 5/2004 | Larsson | |
| 2004/0104913 A1 | 6/2004 | Walls et al. | |
| 2004/0125111 A1 | 7/2004 | Tang-Petersen et al. | |
| 2004/0189677 A1 | 9/2004 | Amann et al. | |
| 2004/0210591 A1 * | 10/2004 | Hirschfeld | G06F 17/30233 |
| 2005/0017980 A1 | 1/2005 | Chang et al. | |
| 2005/0028015 A1 | 2/2005 | Asano et al. | |
| 2005/0088445 A1 * | 4/2005 | Gonzalez | G06F 3/1438 345/502 |
| 2005/0134588 A1 | 6/2005 | Aila et al. | |
| 2005/0144452 A1 * | 6/2005 | Lynch | G06F 21/33 713/170 |
| 2005/0160212 A1 | 7/2005 | Caruk | |
| 2005/0190190 A1 | 9/2005 | Diard et al. | |
| 2005/0190536 A1 | 9/2005 | Anderson et al. | |
| 2005/0270298 A1 | 12/2005 | Thieret | |
| 2005/0278559 A1 | 12/2005 | Sutardja et al. | |
| 2006/0107250 A1 * | 5/2006 | Tarditi et al. | 717/105 |
| 2006/0161753 A1 * | 7/2006 | Aschoff | G06F 3/0613 711/170 |
| 2006/0164414 A1 * | 7/2006 | Farinelli | G06T 15/40 345/422 |
| 2006/0168230 A1 * | 7/2006 | Caccavale et al. | 709/226 |
| 2006/0176881 A1 | 8/2006 | Ma et al. | |
| 2006/0206635 A1 * | 9/2006 | Alexander | G06F 13/28 710/22 |
| 2008/0084419 A1 | 4/2008 | Bakalash et al. | |
| 2008/0238917 A1 * | 10/2008 | Bakalash | G06F 3/14 345/419 |

FOREIGN PATENT DOCUMENTS

| | | |
|---|---|---|
| TW | 485309 | 5/2002 |
| TW | 591400 | 6/2004 |
| TW | 200422936 | 11/2004 |

(56) References Cited

FOREIGN PATENT DOCUMENTS

| TW | I223752 | 11/2004 |
|----|---------|---------|
| TW | 200501046 | 1/2005 |
| WO | 2005010854 | 2/2005 |

OTHER PUBLICATIONS

Casera, S. et al., "A Collaborative Extension of a Visualization System", Proceedings of the First International Conference on Distributed Frameworks for Multimedia Applications (DFMA'05), Feb. 6-9, 2005, Besoncon, France, pp. 176-182.
Stegmaier, S. et al., "Widening the Remote Visualization Bottleneck", Proceedings of the 3rd International Symposium on Image and Signal Processing and Analysis 2003, Sep. 18-20, 2003, Rome, Italy, vol. 1 No. 18, pp. 174-179.
Miller, J. R., "The Remote Application Controller", Computer and Graphics, Pergamon Press Ltd, Oxford, Great Britain, vol. 27 No. 4, Aug. 2003, pp. 605-615.
http://www.informit.com/articles/article.aspx?p=339936, Oct. 22, 2004.
Bhatt, Ajay V., "Creating a PCI Interconnect", Intel Corporation, Jan. 1, 2002, pp. 1-8.
U.S. Appl. No. 60/523,084, filed Nov. 19, 2003, pp. 1-5.
Rupley, Sebastian, "Intel Developer Forum to Spotlight PCI Express," PC Magazine, Sep. 6, 2002, p. 1.

* cited by examiner

USING A SCALABLE GRAPHICS SYSTEM TO ENABLE A GENERAL-PURPOSE MULTI-USER COMPUTER SYSTEM

CROSS REFERENCE TO RELATED APPLICATIONS

This application is a continuation in part and incorporates by reference, the following U.S. patent application: USING A GRAPHICS SYSTEM TO ENABLE A MULTI-USER COMPUTER SYSTEM, by Diamond, M., filed on Jun. 10, 2005, Ser. No. 11/150,620.

FIELD OF THE INVENTION

Embodiments of the present invention generally relate to computer system architectures. More particularly, embodiments of the present invention relate to using a graphics system to enable a multi-user computer system.

BACKGROUND OF THE INVENTION

Technological advances have significantly improved the performance of the computer system. However, there is a limit to the improvement in performance solely from technological advances. In the past, the computer system was mostly a productivity tool. Now, the computer system is evolving into both a digital entertainment tool and a productivity tool.

The traditional architecture of the computer system envisions a single user. But as the computer system is configured with greater processing power (e.g., by increasing the number of processors), greater storage capacity (e.g., by increasing the size of the hard drive), greater graphics rendering capacity (e.g., by increasing the processing power of the graphics processing unit and increasing its graphics memory), and greater network communication capacity (e.g., by increasing network communication bandwidth), the capabilities of the computer system begins to exceed the needs of traditional single users. As the capabilities of traditional computer systems continue to expand, the computer systems purchased by the typical single user are over-powered and beyond what a single user needs and consequently, the increasingly capable computer system is under-utilized by the single user.

SUMMARY

Embodiments of the present invention provide a method and system for using a graphics system to enable a multi-user computer system. Embodiments of the present invention should see improved computer resource utilization when compared to the traditional single user computer system architecture. Taking advantage of virtualized resources, a multi-user computer system will offer fail-safed, user-specific, pay as you go, computing resource allocation on the fly capable of adapting to the changing demands of a variety of subscribing users with varying computing resource needs and varying computer platforms.

In one embodiment, the present invention is implemented as a multi-user computer system. The multi-user computer system includes a central processing unit (CPU), a disk drive configured to support a plurality of users, and a graphics system. The graphics system includes at least one GPU (graphics processing unit) for processing a compute workload. A multi-user manager component is included for allocating the compute workload capability for each one of a plurality of users. Each user will use an access terminal to interact with and access the multiuser computer system. In one embodiment, the compute workload can be physics calculations, transcoding applications, or the like. Alternatively, the compute workload can be 3D computer graphics rendering (e.g., for a real-time 3-D application).

In one embodiment, the access terminal is a display and an input device. User I/O is provided via interaction with the display and the input device (e.g., keyboard, mouse, etc.). In another embodiment, the access terminal is a thin client device having a certain degree of local processor functionality. For example, the thin client device would incorporate a local processor and memory. The local processor would be able to assist functionality provided by the CPU and GPU(s) of the multiuser computer system (e.g., locally decompress data, compressed by a data prior to uploading, and the like).

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1A:
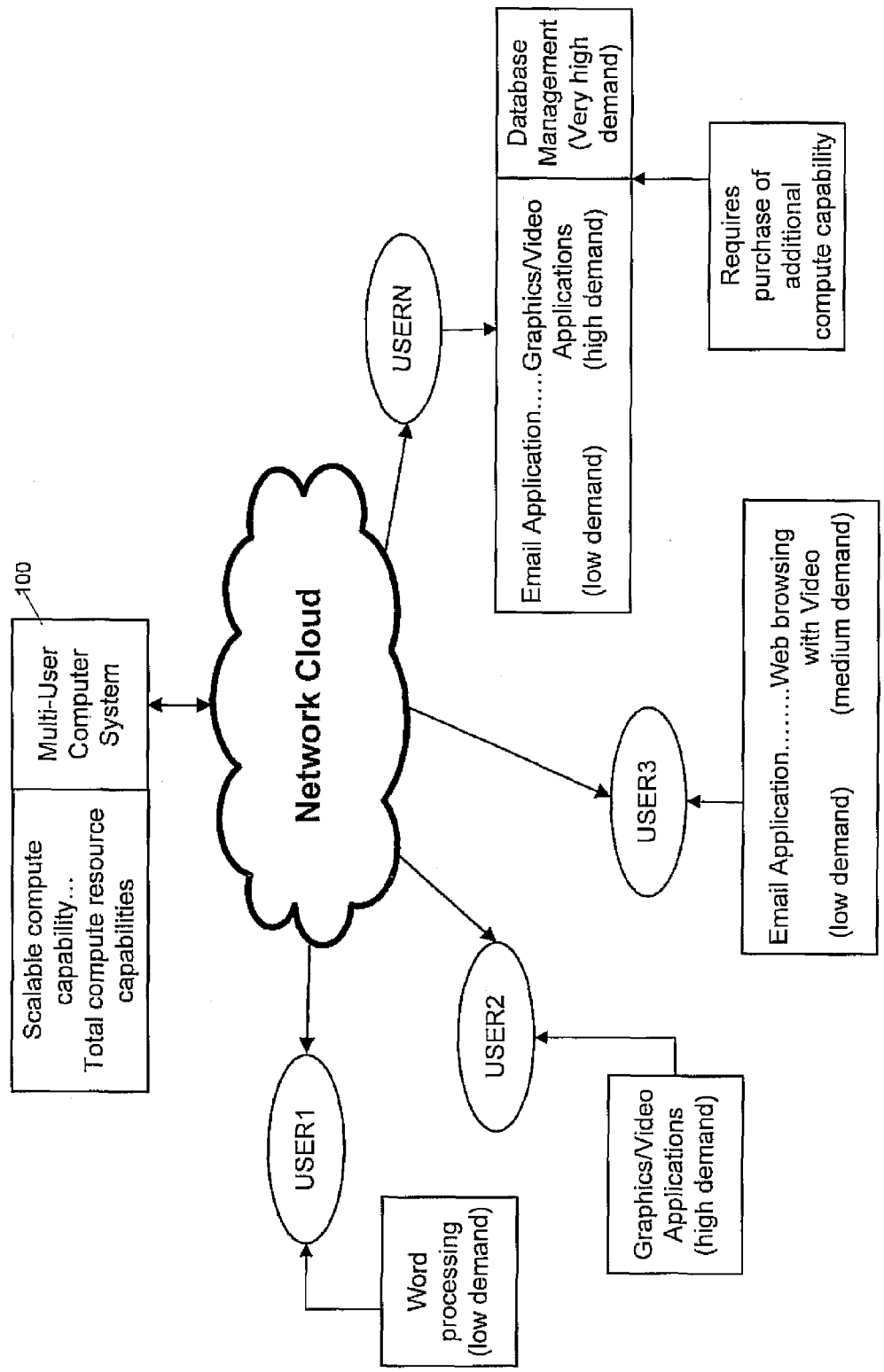
FIG. 1A illustrates an overview of a multi-user computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., multi-user computer system 100 of FIG. 1B), or similar electronic computing device, that manipulates and transforms data represented as physical (electronic) quantities within the computer system's registers and memories and other computer readable media into other data similarly represented as physical quantities within the computer system memories or registers or other such information storage, transmission or display devices.

FIG. 1A illustrates an overview of a multi-user computer system in accordance with an embodiment of the present invention. The multi-user computer system is shown having a plurality of users (USER1, USER2, USER3 . . . USERN) connecting through a Network Cloud to a computer system 100 with scalable compute resource (or workload) capabilities. Taking advantage of virtualized resources, the multi-user computer system will offer a variety of users with varying compute resource needs, utilizing a variety of platforms (lap tops, cell phones, thin clients, etc.), a virtual computer experience. This virtual experience will adapt to the individual user's compute needs on the fly. Other embodiments may offer a "pay as you go" virtual computer that allows a user to purchase only the compute resources they need. Because the individual user works with a virtualized instance, these virtual applications are also fail-safed. In the event of a loss of resources in the multi-user computer system, other available resources are reallocated to support the current compute resource demands of the users. Further, in the event of a loss of resources, while available resources are reallocated, the user is seamlessly switched to alternate resources when necessary without loss of service or personalization of computing environment.

FIG. 1A further illustrates the flexible nature of an embodiment of a virtual computer environment. For example, USER1 is provided a virtual computer environment with the compute resources to handle low resource demands such as word processing applications. USER1 has the desired resource capabilities to meet his needs without having to purchase additional resources that would then go unused. In other words, while a highly capable single user machine would be more than capable of meeting the needs of USER1, the added expensive of unneeded additional resources is avoided by only purchasing the level of resource capability needed from a multi-user computer system.

The other end of the spectrum is illustrated by USER 2, who is provided a virtual computer environment with the compute resources to handle high resource demands such as Graphics and Video applications. Rather than be forced to purchase an expensive single user computer, USER2 is also able to take advantage of a virtual computer environment and purchase all the compute resources needed. An added advantage for USER2 is avoiding computer system obsolescence. As USER2's future compute resource needs grow, USER2 need only purchase additional resources, rather than go through the expense of purchasing an entire computer system.

Meanwhile, USER3 illustrates the capability of the multi-user computer system to allocate resources on the fly. USER3's compute sources needs are on a continuum, from the low resource needs of an email application, to the medium resource needs of web browsing with Video. USER3 will be allocated the compute resources needed, with the ability to reallocate more resources as USER3's demands change. This allows the multi-user computer system to remain efficient, providing the resources that are actually needed or requested, rather than providing a set amount of resources that may go largely unused by a majority of users. Further by efficiently allocating the compute resources, the system is capable of handling requests for large amounts of compute resources, and handling the unexpected loss of resources due to equipment failure, allowing the system to be fail-safe and the reallocation of resources invisible to the users. In other words, the reallocation of resources occurs without the user experiencing any disruption of service or personalization of computing environment.

USERN illustrates the capability of the multi-user computer system to allocate resources on the fly with the added functionality of a "pay as you go" option where additional resources above and beyond the normal allocation are made available to the user for an additional fee. In this example, USERN has a user account that allows the allocation of compute resources for low to high demand applications, as seen with USER3, with the added option of purchasing additional compute resources as needed. A "pay as you go" user would have the benefit of additional resources when needed and only have to pay for them when the additional resources were requested. Rather than having to purchase an expensive user package with more compute resources than necessary on the off chance that they might be necessary in the future, a user can purchase compute resources for today's needs and purchase more as they become necessary. This advantage becomes even more apparent when compared to the single user computer system. Rather than having to purchase a new computer to meet evolving computing demands or purchase a computer up front with more resources than necessary, USERN need only pay the fee to purchase the additional resources when needed.

Figure 1B:
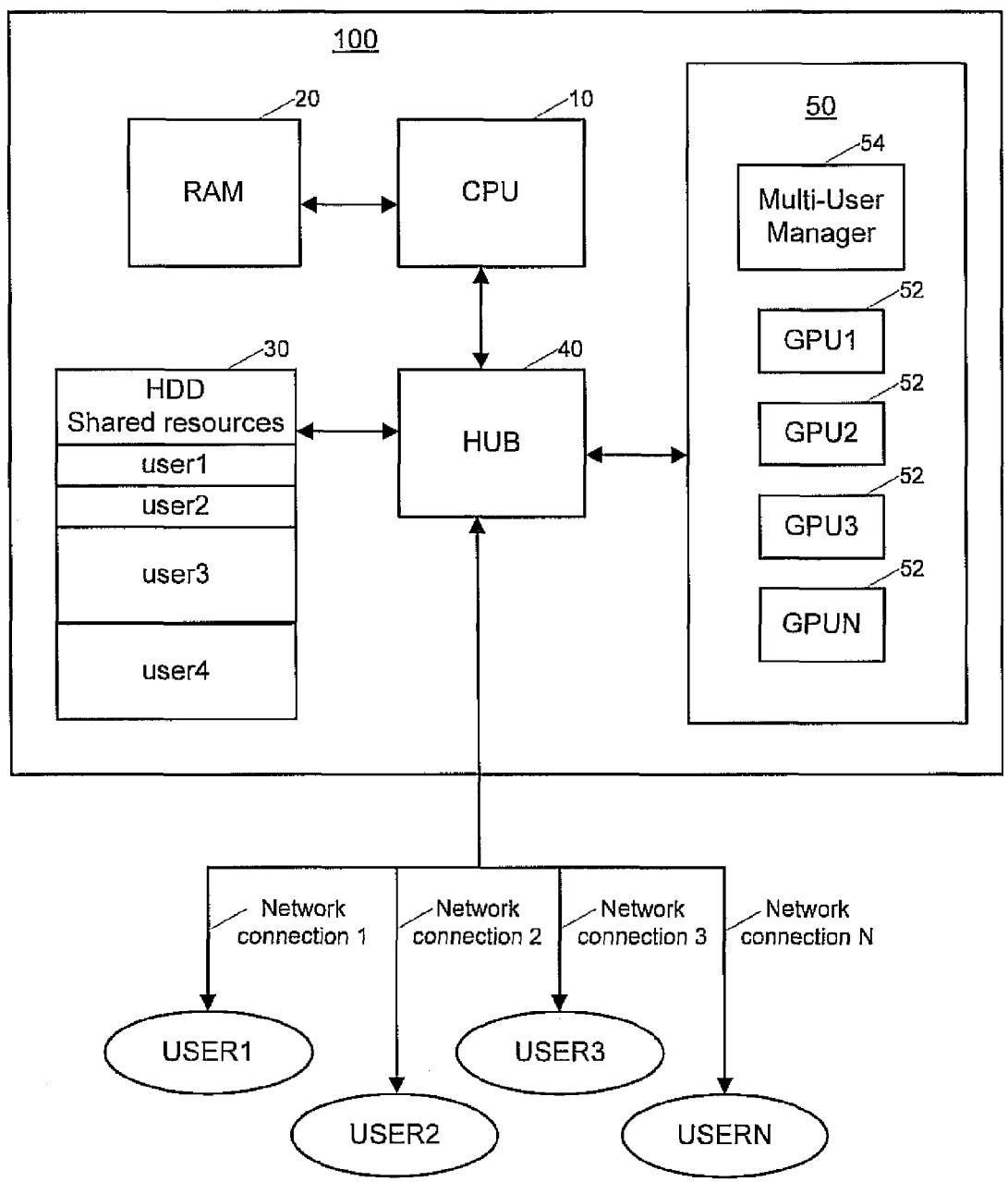
FIG. 1B illustrates a multi-user computer system in accordance with one embodiment of the present invention wherein the graphics system is incorporated into the multi-user computer system as a single unit.

FIG. 1B illustrates a multi-user computer system 100 in accordance with an embodiment of the present invention. The computer system 100 is shown having a CPU 10 and RAM 20 coupled to a hard drive 30 and a graphics system 50 via a hub 40.

As depicted in the FIG. 1B embodiment, the multiuser computer system 100 illustrates a manner in which the traditional computer system is transformed from an underutilized single user computer system into an extensively utilized multi-user computer system 100. The multi-user computer system 100 concurrently supports a number of different users. The FIG. 1B embodiment shows a plurality of different users (e.g., user1, user2, user3 . . . userN). Each user operates a respective access terminal (as later illustrated in FIGS. 3A and 3B). It should be understood that the multi-user computer system 100 may be configured to support any number of users (e.g., 2 users, 16 users, 64 users, etc.). Additionally, it should be understood that the multi-user computer system 100 may have other configurations.

Each user is connected via a wired or wireless network connection (e.g., network connection 1, network connection 2, network connection 3 . . . network connection N) to the multi-user computer system 100. Possible network connections include USB, 802.11, LAN, WPAN (such as Bluetooth), GSM (cell phone networks) and others. In practice, the users share the resources of the multi-user computer system 100. The multi-user computer system 100 provides computational processing, information storage, network communication, and graphical/pixel processing services to the users. In one embodiment, these services are provided to each individual user through the use of a virtual environment. The server/client environment, where a single full-service computer is able to be accessed by multiple users is an example of a virtual environment. Virtualization is the implementation of a virtual machine environment, such that while there is only one server providing all primary processing and data storage, each user on the network will be provided a complete simulation of the underlying hardware. These may be referred to as virtual PCs, virtual machines, and virtual computers, for example. This allows the sharing of the resources of the single computer system (the server) with the plurality of users.

As described above, the multi-user computer system 100 includes the central processing unit 10, the RAM (main memory) 20, the HDD (hard disk drive) 30, and the hub 40. Further, the multi-user computer system 100 has a graphics system 50. In one embodiment, the graphics system 50 includes a plurality of GPUs 52 (GPU1, GPU2, GPU3 . . . GPUN) and a multi-use manager 54. The graphics system 50 may also have other combinations of GPUs 52. Further, additional GPUs 52 may be added to the graphics system 50 in any one of numerous ways. For example, a module (e.g., graphics card) having a single GPU or multiple GPUs may be coupled to the graphics system 50. Further, the graphics system 50 may include more than one graphics card, each with a single GPU or multiple GPUs. The GPU 52 may have one or multiple cores. The GPUs 52 are in communication with the graphics system 50 and the multi-user computer system 100 through well known interfaces such as PCI, PCI-Express, USB, Ethernet, and 802.11. As later illustrated in FIG. 5, the GPUs may be incorporated into a separate chassis.

The GPU 52 is a semiconductor device that specializes in rapidly processing graphical or pixel data compared to a typical CPU 10. However, current GPUs 52 may also be utilized for general purpose processing tasks typically performed by the CPU 10. These general purpose processing tasks, referred to as a "compute workload" in the present invention, may be performed by the graphic system 50. This compute workload may include software applications such as word processing, virus detection, physics modeling, 3D graphics rendering and transcoding. Other applications are also possible. Allocating the compute workload capability of the GPUs 52 among the plurality of users allows each user access to a virtual computer with all the computing capability they currently require.

In the present invention, the graphics system 50 is configured to enable the scaling of processing power in accordance with the number of new users, the amount of desired peak compute workload, and the like. For example, the above mentioned virtualization is implemented wherein the total number of GPUs 52 may be increased to support new users and changing user compute workload demands. As the total compute workload capability of the graphics system 50 can be increased by adding additional GPUs 52 for example. This increased capability may be used to create additional virtual computers for additional users, or for providing increased capability for the virtual computers already in existence.

Figure 2:
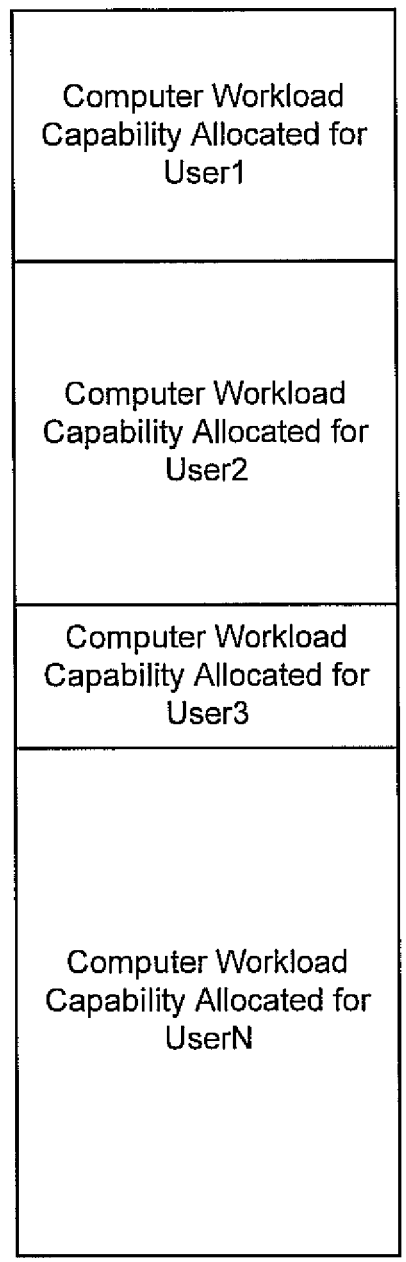
FIG. 2 illustrates allocation of compute workload capability of a graphics system for each user in accordance with one embodiment of the present invention.

FIG. 2 illustrates the allocation of compute workload capability of the graphics system 50 for N number of users (e.g., user1, user2, user3 . . . userN) in accordance with an embodiment of the present invention. In a typical operational scenario, the multi-user manager 54, as depicted in FIG. 1B, receives requests for the multi-user computer system 100 to support additional users. The multi-user manager 54 decides whether to accept the request. If the multi-user manager 54 accepts the request, the multi-user manager 54 allocates compute workload capability for the additional user. As shown in FIG. 2, allocation of compute workload capability is dependent on the needs of the user. As the compute workload increases for a particular user, a larger allocation of compute workload capacity is required for the user. This is illustrated in the varying compute workload demands between a user operating word processing software and another user playing a 3D video game.

Referring again to FIG. 1B, the HDD 30 is partitioned into sections for each user (e.g., user1, user2, user3 . . . userN). Further, the HDD 30 includes a section of shared resources available to all users. If an additional user is accepted, the multi-user computer system 100 is configured to support the additional user. This configuration includes creating a section for the additional user in the HDD 30.

Figure 3A:
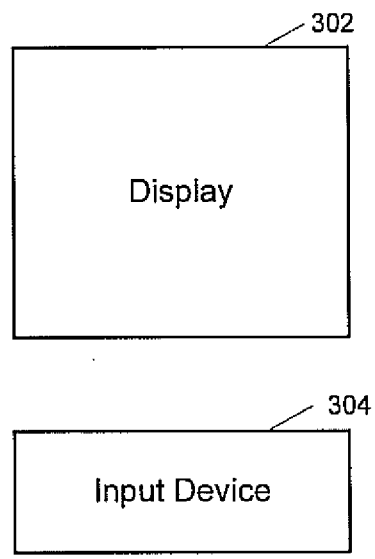
FIG. 3A illustrates an access terminal in accordance with one embodiment of the present invention wherein the access terminal includes a display and input devices

In one embodiment of the present invention as depicted in FIG. 3A, the access terminal includes a display 302 and an input device 304 (such as a keyboard and/or mouse). In such an embodiment, the processing functionality is provided by the multiuser computer system 100. The display 302 is controlled by the computer system 100 and the input device 304 is the means to receive input from the user. The FIG. 3A embodiment has an advantage of being comparatively straightforward to deploy and comparatively easy to maintain.

Figure 3B:
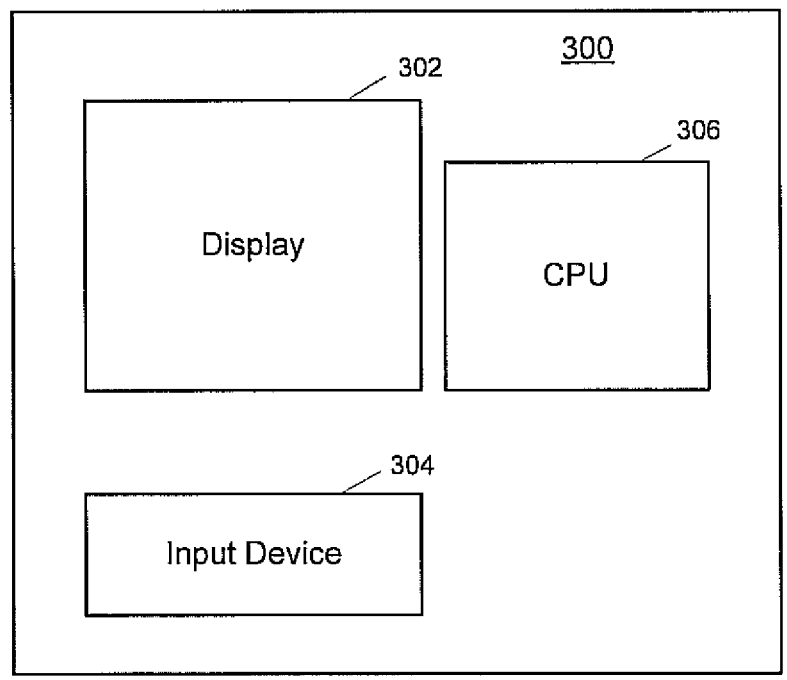
FIG. 3B illustrates an access terminal in accordance with one embodiment of the present invention wherein the access terminal is a thin client.

In another embodiment of the present invention as depicted in FIG. 3B, the access terminal is a thin client 300. A thin client 300 is a computer designed to run on a network with a server, where the server provides the majority of the processing, information storage and software. A thin client 300 might only have a simple user interface accessed from a CD-ROM, a network drive or flash memory. Usually a thin client 300 will have only a display 302, input devices 304 (such as a keyboard and mouse), and the computing ability 306 to handle its own display 304 and the connection to the network. For example, the computing ability 306 can incorporate a local processor and memory. The local processor would be able to assist functionality provided by the CPU and GPU(s) of the multiuser computer system 100 (e.g., locally decompress data, compressed by a data prior to uploading, and the like). In other embodiments of the present invention, the access terminal may contain an integrated display and input device. Examples of integrated display and input devices include a small, hand-held computer, a laptop computer, a cell phone and a PDA (personal digital assistant).

Figure 4:
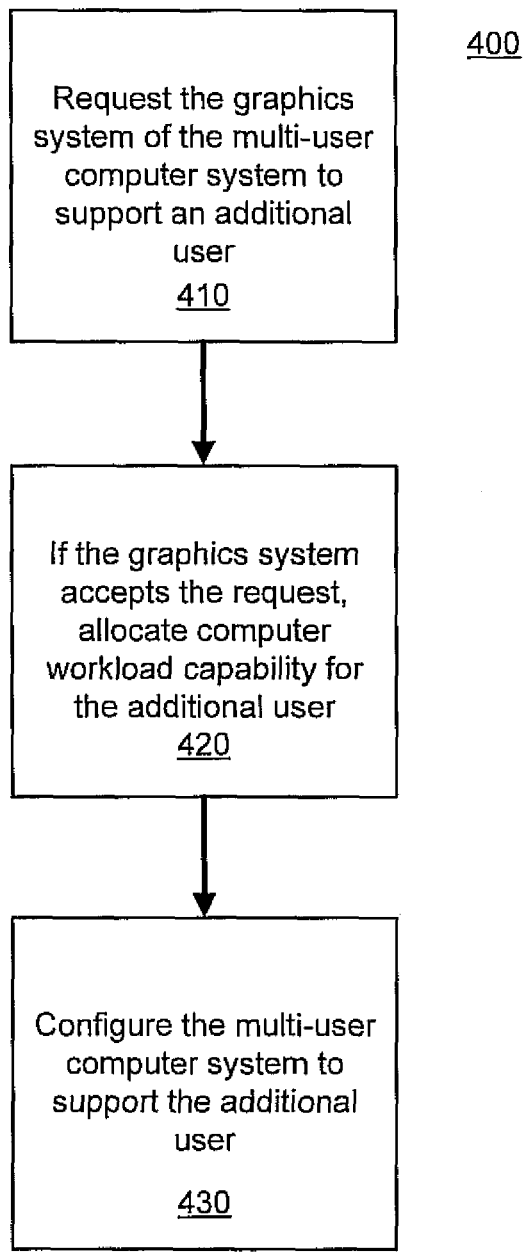
FIG. 4 illustrates a flow chart showing a method of supporting an additional user in a multi-user computer system in accordance with one embodiment of the present invention.

FIG. 4 illustrates a flow chart showing a method 400 of supporting an additional user in a multi-user computer system 100 in accordance with an embodiment of the present invention. Reference is made to FIGS. 1 and 2.

At Block 410, the graphics system 50 of the multi-user computer system 100 is requested to support an additional user. In particular, the multi-user manager 54 receives the request to support the additional user. Moreover, the multi-user manager 54 decides whether to accept the request.

Continuing, at Block 420, compute workload capability is allocated for the additional user if the graphics system 50 accepts the request. Allocation of compute workload capability is depicted in FIG. 2. This allocation of compute workload capability provides the new user a virtual computer scaled to meet their computational needs.

In an embodiment of the present invention, the request may include proof of an additional license for the additional user to use the multi-user computer system 100. In another embodiment, the request may include an authorization key obtained after payment of a fee. In yet another embodiment, the request may include payment for supporting the additional user.

Further, at Block 430, the multi-user computer system 100 is configured to support the additional user. This configuration includes creating a section for the additional user in the HDD 40 of the multi-user computer system 100.

In sum, a seamless virtual computer experience for multiple users is created at a reduced cost and without a cumbersome process. Each user is provided a complete virtual environment provided by the multi-user computer system 100 and its graphics system 50.

Figure 5:
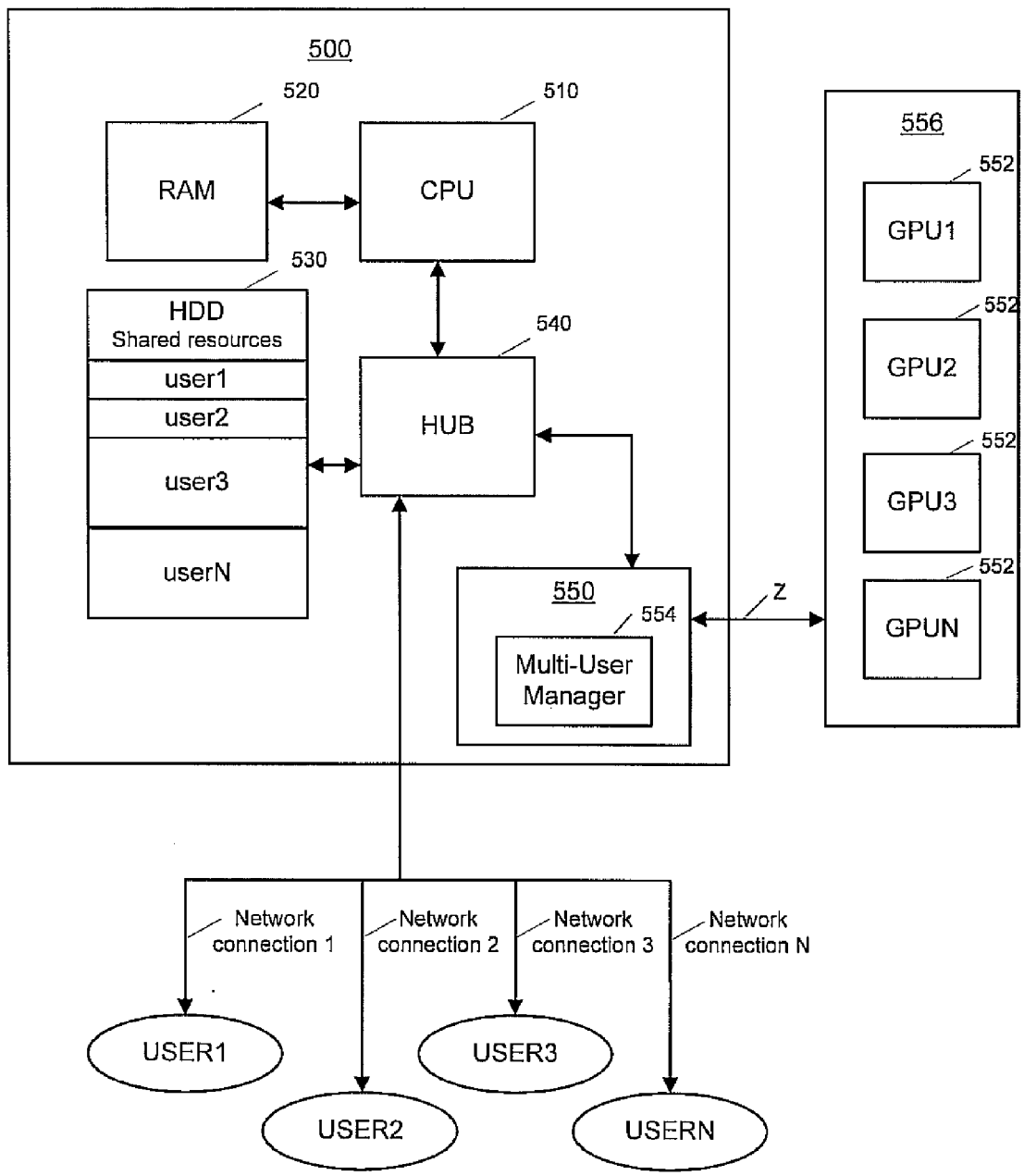
FIG. 5 illustrates a multi-user computer system in accordance with one embodiment of the present invention wherein the graphics system is incorporated into the multi-user computer system with a stand-alone array of GPUs.

Referring to FIG. 5, another embodiment of the present invention is illustrated. The graphics system 550 includes four GPUs 552 in a separate array 556. This array 556, fixed in a separate chassis from the rest of the multi-user computer system 500, may exist as a single array 556 as depicted in FIG. 2, or as a plurality of arrays (not shown). Further, any number of GPUs 552 may exist in the array 556. It should be understood that the multi-user computer system 500 may have other configurations. For example, the array 556 and multi-user computer system 500 may be placed in a single chassis. Further, the array 556 and/or multi-user computer system 500 may be rack-mounted for use in a rack mount chassis. The GPUs 552 may be hot-swappable, allowing the removal and addition of GPUs 552 without powering down the multi-user computer system 500. An obvious benefit received from hot-swapping GPUs 552 is easy scaling of the graphics system 550 without disruption for the current users. The array 556 of GPUs 552 is in communication with the graphics system 550 and the multi-user computer system 500 via a transmission line Z through any of a number of ways well known in the art, such as PCI, PCI-X, and PCI Express.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus comprising:
a single physical server comprising:
    a plurality of GPUs (graphics processing units);
    a compute workload capability (CWC) property that indicates available compute workload processing capability of the plurality of GPUs for non-graphics tasks and qraphics tasks and that is allocated per user to a plurality of users in an exclusive non-overlapping manner based on an actual user need or a user request; and
a plurality of systems remote from the plurality of users and including a processing system that includes a central processing unit (CPU), a storage system that includes a storage drive, and a graphics system that includes the GPUs,
wherein the graphics system is configured to receive via a network cloud a support access request, from an additional user, for the single physical server to support use by the additional user as a new user and is configured to grant or to deny the support access request by the additional user to the single physical server based on the CWC property and prior individual exclusive allocations of the CWC property to the users.

2. The apparatus as recited in claim 1, wherein the compute workload processing includes at least one of word processing, virus detection, physics calculations, transcoding and 3D computer graphics rendering, wherein the graphics system includes a multi-user manager configured to allocate compute workload capability for each one of the users, wherein each user uses an access terminal.

3. The apparatus as recited in claim 2, wherein the multi-user manager on demand allocates the compute workload capability for each user in response to the changing compute workload needs of the user.

4. The apparatus as recited in claim 2, wherein the multi-user manager allocates the compute workload capability for each user based on the compute workload capability purchased by the plurality of users.

5. The apparatus as recited in claim 2, wherein the multi-user manager receives a request to support an additional user, and if accepted, the multi-user manager allocates the compute workload capability for the additional user.

6. The apparatus as recited in claim 2, wherein the compute workload capability for each user is unaffected when compute resources are reallocated.

7. The apparatus as recited in claim 2, wherein the access terminal includes a display and an input device, wherein the graphics system is operable to consider financial-related information of the support access request when granting or denying the support access request, and wherein the graphics system is configured to scale up or to scale down number of GPUs in operation.

8. A multi-user computer system comprising:
a single physical server comprising:
    a plurality of GPUs (graphics processing units);
    a compute workload capability (CWC) property that indicates available compute workload processing capability of the plurality of GPUs for non-graphics tasks and graphics tasks and that is allocated per user to a plurality of users in an exclusive non-overlapping manner based on an actual user need or a user request;
a processing system that is remote from the plurality of users and that includes a central processing unit (CPU);
a storage system that is remote from the users and that includes a storage drive; and
a graphics system that is remote from the users and that includes the GPUs, wherein the graphics system is configured to receive via a network cloud a support access request, from an additional user, for the single physical server to support use by the additional user as a new user and is configured to grant or to deny the support access request by the additional user to the single physical server based on the CWC property and prior individual exclusive allocations of the CWC property to the users, and wherein the graphics system is configured to scale up or to scale down number of GPUs in operation.

9. The multi-user computer system as recited in claim 8 wherein the compute workload processing includes at least one of: word processing, virus detection, physics calculations, transcoding and 3D computer graphics rendering, wherein the storage system is configured to support the users, and wherein the graphics system further includes a multi-user manager configured to allocate compute workload capability for each one of the users, wherein each user uses an access terminal.

10. The multi-user computer system as recited in claim 9 wherein the multi-user manager on demand allocates the compute workload capability for each user in response to the changing compute workload needs of the user.

11. The multi-user computer system as recited in claim 9 wherein the multi-user manager allocates the compute workload capability for each user based on the compute workload capability purchased by the plurality of users.

12. The multi-user computer system as recited in claim 9 wherein the multi-user manager receives a request to support an additional user, and if accepted the multi-user manager allocates the compute workload capability for the additional user.

13. The multi-user computer system as recited in claim 9 wherein the compute workload capability for each user is unaffected when compute resources are reallocated.

14. The multi-user computer system as recited in claim 9 wherein the access terminal includes a display and an input device, and wherein the graphics system is operable to consider financial-related information of the support access request when granting or denying the support access request.

15. A method of supporting an additional user in a multi-user computer system, the method comprising:
providing a single physical server comprising a plurality of GPUs (graphics processing units), a compute workload capability (CWC) property that indicates available compute workload processing capability of the plurality of GPUs for non-qraphics tasks and graphics tasks and that is allocated per user to a plurality of users in an exclusive non-overlapping manner based on an actual user need or a user request, and a plurality of systems remote from the plurality of users and including a processing system that includes a central processing unit (CPU), a storage system that includes a storage drive, and a graphics system for use by the users, wherein the graphics system includes the GPUs and a multi-user manager;
using the graphics system to receive via a network cloud a support access request, from the additional user, for the single physical server to support use by the additional user as a new user and to grant or to deny the support access request by the additional user to the single physical server based on the CWC property and prior individual exclusive allocations of the CWC property to the users; and
using the graphics system to scale up or to scale down number of GPUs in operation.

16. The method as recited in claim 15 wherein the multi-user manager is configured to allocate compute workload capability, wherein the using the graphics system to receive includes:
requesting the graphics system of the single physical server to support the additional user which uses an access terminal,
if the graphics system accepts the request, allocating the compute workload capability for the additional user, and
configuring the single physical server to support the additional user, wherein the compute workload processing includes at least one of: word processing, virus detection, physics calculations, transcoding, and 3D computer graphics rendering.

17. The method as recited in claim 16 wherein the multi-user manager on demand allocates the compute workload capability for each user in response to the changing compute workload needs of the user.

18. The method as recited in claim 16 wherein the multi-user manager allocates the compute workload capability for each user based on the compute workload capability purchased by users.

19. The method as recited in claim 16 wherein the compute workload capability for each user is unaffected when compute resources are reallocated.

20. The method as recited in claim 16 wherein the access terminal includes a display and an input device, and wherein the graphics system is operable to consider financial-related information of the support access request when granting or denying the support access request.

21. The method as recited in claim 16 wherein the multi-user manager is configured to decide whether to accept the request.

* * * * *